I. MOSCICKI.
APPARATUS FOR TREATING GASES BY ELECTRICITY.
APPLICATION FILED AUG. 28, 1906.

930,212.

Patented Aug. 3, 1909.

I. MOSCICKI.
APPARATUS FOR TREATING GASES BY ELECTRICITY.
APPLICATION FILED AUG. 28, 1906.

930,212.

Patented Aug. 3, 1909.
2 SHEETS—SHEET 2.

UNITED STATES PATENT OFFICE

IGNACY MOSCICKI, OF FRIBOURG-GAMBACH, SWITZERLAND.

APPARATUS FOR TREATING GASES BY ELECTRICITY.

No. 930,212.  
Specification of Letters Patent.  
Patented Aug. 3, 1909.

Application filed August 28, 1906. Serial No. 332,325.

*To all whom it may concern:*

Be it known that I, IGNACY MOSCICKI, electrochemist, citizen of Russia, residing at Fribourg-Gambach, Switzerland, have invented certain new and useful Improvements in Apparatus for Treating Gases by Electricity; and I do hereby declare the following to be a full, clear, and exact description of the invention, such as will enable others skilled in the art to which it appertains to make and use the same.

This invention relates to the art of treating gases by electricity, and it has particular reference to apparatus for obtaining gases such as nitric oxids from mixtures of gas by subjecting them to the action of the electric current.

Apparatus for obtaining nitric oxids from mixtures of gas by means of the electric flame arc are already known but most of these have the disadvantage that the product obtained is small relatively to the energy consumed, and only small percentages of nitric oxids are contained in the product which leaves the apparatus. Repeatedly passing the mixture of gas already containing nitrous oxids through the electric flame is not advantageous on account of the wasteful utilization of the energy and the diminution of the product thereby resulting. In the apparatus that forms the subject of the present application, these disadvantages are obviated in a simple and convenient manner. With this apparatus a product is obtainable which far surpasses those obtained hitherto alike as regards high percentage concentration of the nitrous oxids as in the quantity of nitrous oxids relatively to the consumption of energy.

Figure 1:
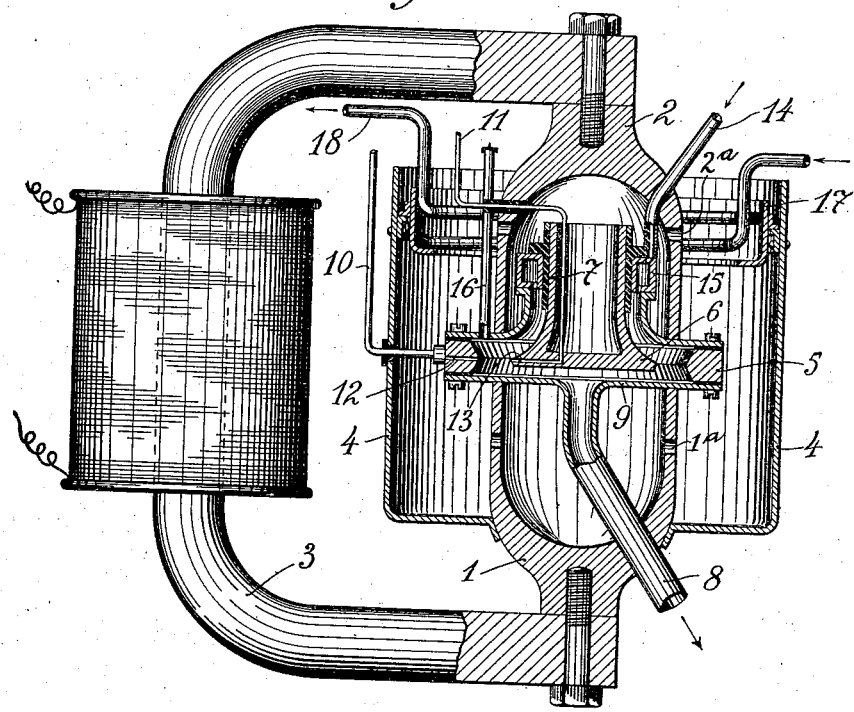
Figure 2:
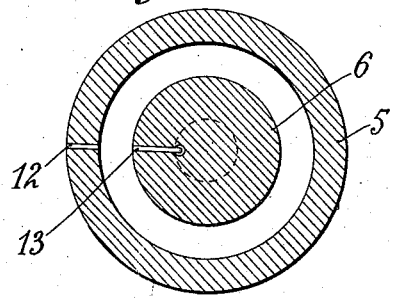
Figure 3:
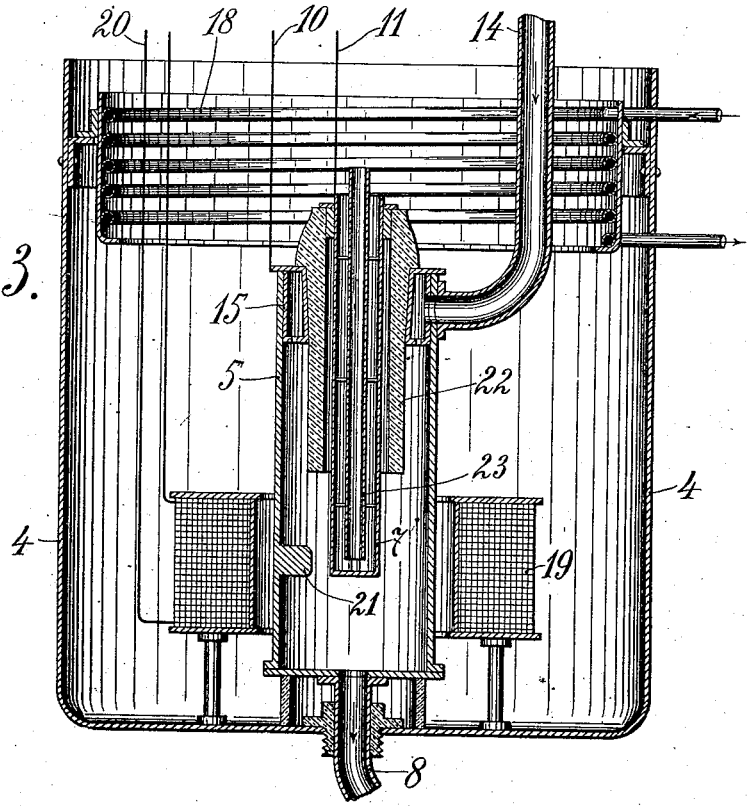
Figure 4:
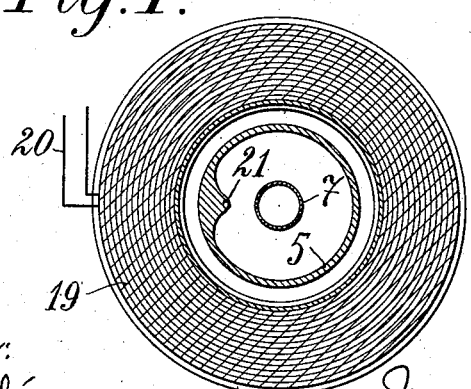

The accompanying drawing illustrates two forms of the invention, Figure 1 being a longitudinal section of the first of these, Fig. 2 a transverse section of the same through the electrodes and Figs. 3 and 4 similar views of the second form of the invention.

Between the two hollowed pole pieces 1 and 2 of an electromagnet 3, the lower one of which carries a receptacle 4 for cooling liquid, two electrodes 5 and 6 are arranged concentrically to one another leaving an annular space between them. The electrode 6 forms part of a hollow body, which is inserted in the support for the electrode 5 and is insulated from the support by a casing 7 made of non-conducting material. The space inside the electrode 5 is closed at the bottom by a plate 9 formed with a discharge pipe 8. 10 and 11 are pipes for the lighting gas, for example, oxygen, that run to the ducts 12 and 13 in the two electrodes and act likewise as current conductors.

The supply pipe 14 for mixture of gases opens into the annular distributer 15, which communicates with the space between the two electrodes by a large number of openings formed in its bottom. An igniting tube 16 arranged on the support for the electrode 5 and closable by means of a cover serves, when the apparatus is started, to ignite the stream of gas passing out of the ducts 12 and 13, so as to maintain a constantly burning gas-igniting flame.

In the upper part of the receptacle 4 is suspended an open-bottom vessel 17 constituting a support for a pipe-coil 18 through which cooling water is circulated. The receptacle 4 is filled nearly to the top with a cooling liquid, oil for example, which enters the interior of the pole-pieces 1 and 2 through openings 1$^a$ and 2$^a$ formed in the sides thereof and fills them. In this way the electrodes and the adjoining parts of the apparatus are sufficiently cooled.

In the form of the apparatus or furnace for the treatment of gases illustrated in Figs. 3 and 4 the coil 19 for forming the magnetic field and connected by the conductors 20 with a source of current is arranged in the cooling vessel 4. In the outer annular electrode 5 formed by a cylindrical casing, which for facilitating the ignition and forming the path for the stream of flame is provided at the required height with a projection 21, the inner electrode 6, which is likewise cylindrical, is inserted from above. A sleeve 22 made of insulating material separates the two electrodes from each other. In order to insure as effective cooling of the inner electrode as possible a tube 23 is inserted in the hollow space therein. This tube is open at the bottom and so promotes the circulation of the cooling fluid. The introduction and distribution of the mixture of gases and the carrying off thereof are effected in a similar manner as in the form shown in Fig. 1. Under this modification the conductors 10 and 11 are in the form of wires instead of being pipes, as in Fig. 1. The electrodes may be supplied with either continuous or alternating current.

If the two conductors 10 and 11 are connected with a source of continuous current, the flame or arc produced will have a circular motion and will continually traverse the annular space or interval between the outer annular and the inner electrode, producing the effect of a continuous annular sheet of flame closing said annular space. This effect takes place from the moment when the circuit is closed and the electric arc formed, and is due to the speed with which said arc travels under the influence of the field between the two electrodes, presenting to the spectator a surface shutting off the circular space. The velocity of the flame, if the dimensions of the two electrode circumferences remain the same and in the same magnetic field is dependent on the intensity of the current in the flame. The flame may thus in any desired short period (for example 1/1000 second) return to its starting point. This is not only visible to the eye of the spectator, but may be regarded practically as if it constantly filled up the circular space between the two electrodes through which the mixture of gases to be treated passes.

In consequence of the rotation of the path of the flame in the magnetic field an electromotive force is induced therein, which is contrary to that of the source of current and thus restricts the current intensity in the flame, precisely as in electric motors. In the latter as is well known, the counter-electromotive force induced in these windings in consequence of the rotation of the armature in the magnetic field prevents unlimited increase in the intensity of the current; that is, prevents short-circuiting. As when the apparatus is started the flame remains continuously in the same proportions, alternations in the current, which would cause "flickering" in the generator do not occur and consequently by the parallel circuiting of several apparatus it is possible to fully charge the generator. The rapid rotation of the flame causes all parts of the mixture of gases passing through the apparatus to come into contact therewith and consequently the percentage of nitric oxids in the product coming from the apparatus is exceedingly large. If continuous current be employed, the gas flame for facilitating the formation of the electric flame may be replaced by a carbon filament connecting the two electrodes which burns away as the flame is formed and can be easily renewed before the apparatus is started again.

When alternating current is employed the direction in which the flame arc circulates is altered, every time the current curve passes through the zero line, unless the magnetic field be also produced by the same alternating current; the other conditions are similar as with continuous current. The coil 19 that produces the magnetic field could also be connected in series with the electrodes of the apparatus and in this case if alternating current be employed act also as a choking coil.

The ignition can be effected, whether with continuous current or alternating current working, by means of a source of electric energy which produces alternating current of high potential and high frequency.

For cooling purposes oil is generally used. In apparatus requiring a large amount of energy water may also be used, which can for example, be easily effected with two apparatus connected in series, as in that case one electrode of each apparatus can be connected with earth.

Instead of each of the two starting points of the current path of the flame describing a circle when the circular space is passed through by the flame, the point from which the path starts from the electrodes may be situated on any two curves one of which is arranged inside the other and which may be equidistant or not. It is not necessary that the electrodes be arranged in the same plane, as they might be arranged in different planes parallel to each other whereby the electric flame will in its rotation describe a cylinder or a cone frustum.

In all these modifications each of the two starting points of the current path of the flame, in passing through the circular space describes, what is to be regarded as essential, a continuous curve through the path of the current.

The cross-section of the circular space between the two electrodes can always be made small enough for corresponding energy, in order to insure a forward movement of the gases, or to insure the direct drawing off of the gases treated, without coming into the flame a second time.

It will be seen from the above that, under both forms in which I have represented my invention in its preferred embodiment, the same comprises an electric furnace for the treatment of gases in which an annular electrode, 5, and an electrode 7, terminating within arcing distance of the annular electrode, are so arranged that the gases flow through said annular electrode and in the direction in which the free end of the latter electrode faces. The lower end of the electrode 7 which is preferably arranged concentrically within the annular electrode, 5, as shown, is also shown as having its lower circumferential edge within arcing distance of the annular electrode 5 and in a plane transverse to the flow of the gases, and, moreover, the inlet and outlet for the gases to be treated are arranged at opposite ends of the furnace chamber and so that the above direction of flow takes place. This arrangement makes it possible to maintain a rotating arc at the terminal point of the inner electrode, when said arc is subjected to the action of the arc rotating means, taking the form of the electromagnet 3 or the coil 19 under the embodiments shown in the drawing.

Having thus fully described my invention, what I claim is:

1. In an electric furnace for the treatment of gases, the combination with a furnace chamber, and means for supplying untreated gases to and removing treated gases from said furnace chamber, whereby there is caused a flow of gas through said chamber, of an annular electrode through which the gases flow, another electrode terminating with a free end which is within arcing distance of the annular electrode, said free end facing in the direction toward which the gases flow, and means for causing an angular movement of the arc.

2. In an electric furnace for the treatment of gases, the combination with a furnace chamber, and means for causing a flow of gases in a predetermined direction in said chamber, of a substantially annular electrode through which the gases flow, said annular electrode having an inward-projecting edge lying in a plane transverse to the flow of gases, a second electrode having a circumferential edge lying in a plane transverse to the flow of gases, every part of said circumferential edge being within arcing distance of the nearest portion of the edge of the annular electrode, and means for causing an angular movement of the arc.

3. In an electric furnace for treating gases, the combination with a furnace chamber, and means for causing a flow of gases in a predetermined direction within said chamber, of a substantially annular electrode through which the gases flow, a second electrode having a circumferential edge lying in a plane transverse to the flow of gases every part of said circumferential edge being within arcing distance of the nearest portion of the annular electrode, means for starting the arc in the plane of the said circumferential edge, and means for causing an angular movement of the arc.

4. In an electric furnace for the treatment of gases, the combination with a furnace chamber, and means for causing a flow of gases in said chamber, of an annular electrode through which the gases pass, an electrode having a plate like terminal which is concentric with and within arcing distance of the annular electrode, and means for imparting an angular movement to the arc formed between the said electrodes.

5. In an electric furnace for the treatment of gases, the combination, with a pair of separated circular concentric electrodes, arranged to form a circular arcing space, of means for producing a magnetic field whose flux cuts said arcing space, means for causing a flow of the gases to be treated through said arcing space, and means for supplying an igniting gas to said space.

6. In an electric furnace for the treatment of gases, the combination, with a furnace chamber, of a pair of electrodes within said furnace chamber, one of said electrodes being annular, the other electrode terminating with a free end which is within arcing distance of the annular electrode, electro-magnetic means for rotating the arc, and means for causing the gases in the furnace chamber to flow in the direction in which the free end of the inner electrode faces.

7. In an electric furnace for the treatment of gases, the combination of a furnace chamber having a gas supply at one end and a gas outlet at the opposite end, an annular electrode through which the gases flow between the said supply and the said outlet, an inner electrode arranged concentric with the annular electrode and terminating in a free end facing the gas outlet and within arcing distance of the annular electrode, and means for causing the arc formed between the electrodes to travel annularly.

8. In an electric furnace for the treatment of gases, the combination of a furnace chamber having a closed lower end with a gas outlet therein, gas-supplying means at the upper end of the furnace, an annular electrode constituting a portion of the wall of the furnace chamber, an inner electrode inserted through the support for the annular electrode and arranged concentrically therewith, means for rotating the arc formed between the two electrodes, and a distributer arranged between the gas-supplying means and the space between the two electrodes.

9. In a furnace for treating gases, the combination of a furnace chamber, an annular electrode in said chamber, means for causing an axial flow of gases through said electrode, an inner hollow electrode concentric with the annular electrode, means for rotating the arc formed between the electrodes, and means for supplying a cooling agent to the interior of the hollow electrode and around the annular electrode.

10. In a furnace for treating gases, the combination of a furnace chamber, an annular electrode set in the wall of said chamber, means for supplying untreated gases to the chamber above the annular electrode, means for drawing off the treated gases below the said electrode whereby the gases are caused to flow axially through the electrode, an inner electrode concentric with the annular electrode and within arcing distance of the same, conductors supplying current to the electrodes whereby an arc is formed transverse to the flow of the gases, said conductors also supplying igniting gas to the arc, and means for rotating the arc.

11. In a furnace for treating gases, the combination of a furnace chamber, an annular electrode in the wall of said chamber, an inner electrode concentric with and within sparking distance of the annular electrode, means for establishing an axial flow of gases through the annular electrode, means for forming and maintaining an arc between the electrodes, a receptacle for cooling liquid surrounding the furnace chamber, and a cooling coil in said receptacle.

In testimony whereof I affix my signature to this specification, in the presence of two witnesses.

IGNACY MOSCICKI.

Witnesses:
 FRIEDRICH NAEGSLI,
 NATHANËL LENHA.